US012648837B2

(12) United States Patent
Christiansen et al.

(10) Patent No.: US 12,648,837 B2
(45) Date of Patent: Jun. 9, 2026

(54) COMPACT INTRAORAL 3D-SCANNER AND A METHOD OF OPTIMIZING SUCH

(71) Applicant: 3SHAPE A/S, Copenhagen K (DK)

(72) Inventors: Alexander Bruun Christiansen, Copenhagen K (DK); Christoph Vannahme, Copenhagen K (DK)

(73) Assignee: 3SHAPE A/S, Kobenhavn K (DK)

( * ) Notice: Subject to any disclaimer, the term of this patent is extended or adjusted under 35 U.S.C. 154(b) by 172 days.

(21) Appl. No.: 18/690,313

(22) PCT Filed: Sep. 8, 2022

(86) PCT No.: PCT/EP2022/075003
§ 371 (c)(1),
(2) Date: Mar. 8, 2024

(87) PCT Pub. No.: WO2023/036876
PCT Pub. Date: Mar. 16, 2023

(65) Prior Publication Data
US 2024/0374357 A1     Nov. 14, 2024

(30) Foreign Application Priority Data
Sep. 10, 2021     (EP) ..................................... 21195934

(51) Int. Cl.
*G02B 7/09*          (2021.01)
*A61C 9/00*          (2006.01)
*G02B 13/24*         (2006.01)

(52) U.S. Cl.
CPC .............. *A61C 9/0053* (2013.01); *G02B 7/09* (2013.01); *G02B 13/24* (2013.01)

(58) Field of Classification Search
CPC ......... A61C 9/0053; G02B 7/09; G02B 13/24
See application file for complete search history.

(56) References Cited

U.S. PATENT DOCUMENTS

| | | | |
|---|---|---|---|
| 10,952,827 B2 | 3/2021 | Verker et al. | |
| 2016/0231551 A1* | 8/2016 | Berner | G02B 21/0028 |
| 2018/0192877 A1* | 7/2018 | Atiya | A61B 5/0088 |
| 2018/0313644 A1* | 11/2018 | Glinec | A61C 9/006 |

(Continued)

FOREIGN PATENT DOCUMENTS

| | | |
|---|---|---|
| CA | 2681082 C | 9/2011 |
| CN | 110623763 A | 12/2019 |

OTHER PUBLICATIONS

International Search Report (PCT/ISA/210) and Written Opinion (PCT/ISA/237) mailed on Dec. 2, 2022 by the European Patent Office as the International Searching Authority for International Application No. PCT/EP2022/075003. (11 pages).

(Continued)

*Primary Examiner* — Thai Q Tran
*Assistant Examiner* — Jose M Mesa
(74) *Attorney, Agent, or Firm* — BUCHANAN INGERSOLL & ROONEY PC

(57) ABSTRACT

The present disclosure relates generally to a compact intraoral 3D-scanner. More specifically, the present disclosure relates to the field of satisfying a condition for a compact intraoral 3D-scanner, particularly such that intraoral 3D-scanning is optimally performed. The present disclosure relates further to a method of optimizing a compact intraoral 3D-scanner.

15 Claims, 1 Drawing Sheet

(56) References Cited

U.S. PATENT DOCUMENTS

2019/0046302 A1 * 2/2019 Li ......................... A61B 5/682
2020/0315434 A1 * 10/2020 Kopelman ........... A61C 9/0053

OTHER PUBLICATIONS

Jeong, Hyeong-Jun, et al., "High-speed 3-D measurement with a large field of view based on direct-view confocal microscope with an electrically tunable lens", Optics Express, Feb. 22, 2016, vol. 24, No. 4, pp. 3806-3816. (11 pages).

Zamofing, Thierry, et al., "Applied multifocus 3D microscopy", Society of Photo-Optical Instrumentation Engineers (SPIE), 2003 (month unknown), vol. 5265-19. (11 pages).

Gharib, Saman R., et al., "A Confocal Laser Scanning Microscope Investigation of the Epiphany Obturation System", Journal of Endodontics (JOE), Aug. 8, 2007, vol. 33, No. 8, pp. 957-961. (5 pages).

* cited by examiner

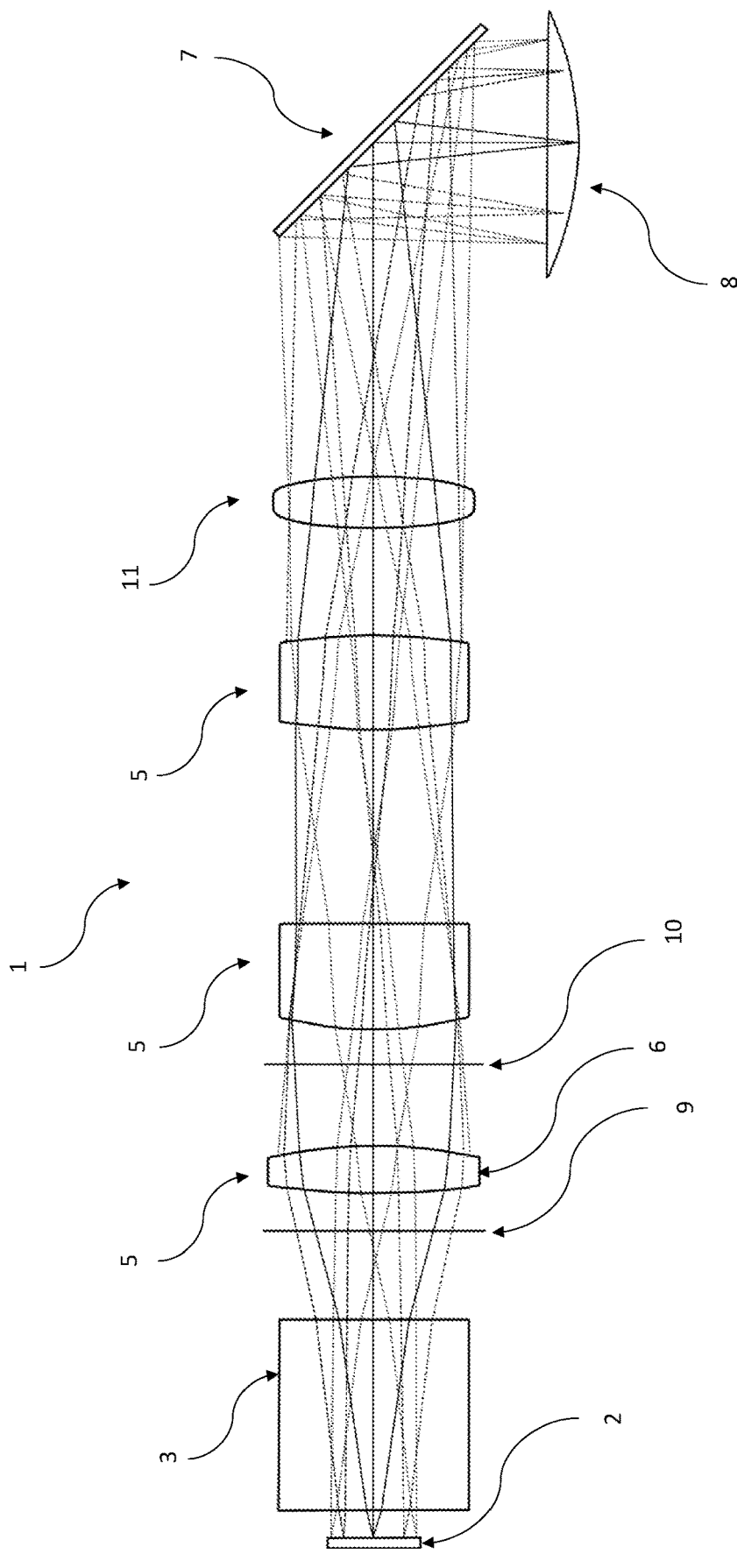

1

COMPACT INTRAORAL 3D-SCANNER AND A METHOD OF OPTIMIZING SUCH

FIELD OF THE INVENTION

The present disclosure relates generally to a compact intraoral 3D-scanner. More specifically, the present disclosure relates to the field of satisfying a condition for a compact intraoral 3D-scanner, particularly such that intraoral 3D-scanning is optimally performed. The present disclosure relates further to a method of optimizing a compact intraoral 3D-scanner.

BACKGROUND 3D-scanning is well-established in various industrial fields, where various 3D scanning technologies have been applied for several decades. Some 3D scanning technologies relate to triangulation and others relate to confocal, depth-from-focus, or depth-from-defocus.

Triangulation is based on viewing a scene from one, two or more different directions being different from a light projection direction.

Confocal scanning can be mechanical or chromatic. In mechanical confocal scanning, an optical element, such as a lens is mechanically moved back and forth to scan a volume, while projected light is spatially filtered in the detector plane. In chromatic confocal scanning, a volume is scanned by illuminating light through a highly chromatic material and changing the scanning wavelength, while projected light is spatially filtered in the detector plane.

In depth-from-focus scanning, an optical element, such as a lens is also moved back and forth to scan a volume, and depth is estimated from a focus measure, without the need of spatially filtering. In depth-from-defocus, an optical property, such as the aperture, is changed between the capturing of two images, whereby depth is estimated by determining the degree of defocus between the two images.

Mechanical confocal scanning and depth-from-focus scanning both have an optical element that is moved back and forth to scan the volume. From this point, they therefore remind of each other, but depth-from-focus offers many advantages over mechanical confocal scanning.

For example, since light is not spatially filtered in a depth-from-focus scanner as in mechanical confocal scanner, there is a much higher light through-put in a depth-from-focus scanner than in a mechanical confocal scanner. Accordingly, a low-power light source, such as a light emitting diode (LED) can be used in a depth-from-focus scanner, instead of high-power laser as is typically used in a mechanical confocal scanner. This implies even further advantages, here including that a depth-from-focus scanner in comparison to a mechanical confocal scanner, typically has a simpler mechanical construction, and the option of using the LED to also provide color images, for example such that an additional light source is also not required. All this also mean that a depth-from-focus scanner typically is smaller than mechanical confocal scanner. Further, and according to the above, a depth-from-focus scanner is typically associated with a lower manufacturing cost.

Some of these advantages and facts, have been described in general in the article "Applied multifocus 3D microscopy" by Zamofing et al., SPIE Vol. 5265-19, 2003. This article compares different scanning technologies: depth-from-focus (multifocus 3d microscopy), chromatic confocal scanning (chromatic aberration), mechanical confocal scanning (confocal microscopy) and white-light interferometry.

In the field of dentistry, 3D scanning is also well-established, and scanners are both used for impression scanning using 3D lab-scanners and for intraoral scanning using 3D intraoral scanners. The various scanning technologies, as described above, have been applied and developed in the field of intraoral scanning, at least over the last four decades.

3D intra-oral scanners are developed in various sizes, depending on many factors, here including the implemented scanning technology. It is desirable to provide a compact and lightweight intraoral 3D-scanner. Firstly, a compact and lightweight scanner makes it easy for the operator to handle the intraoral 3D-scanner during a scanning session. It is advantageous that the intraoral 3D-scanner is light and compact as this may ensure that the scanner can be smoothly moved around in the oral cavity while obtaining information, and in some instances without the need to adjust the grip on the scanner. Secondly, a compact scanner makes it pleasant for the patient, as the intraoral 3D-scanner is inserted into the mouth. A compact scanner may further ensure that parts within oral cavity having limited space can be reached. Most intra-oral scanners today are relatively large, and it is therefore desirable to provide compact intraoral scanners.

A compact 3D intraoral scanner has been described in US 2018/0192877.

Although US 2018/0192877 describes a compact intraoral 3D-scanner, US 2018/0192877 does not disclose how to provide an optimal intraoral 3D-scanner.

It is thus desirable to provide an intraoral 3D-scanner that is compact and lightweight and also to provide a method of how to optimize a compact and lightweight intraoral 3D-scanner.

SUMMARY

The present disclosure provides a compact intraoral 3D-scanner.

The present disclosure provides a compact intraoral 3D-scanner, comprising:

a detector, defined by a horizontal sensor size, $H_{sensor}$, wherein $H_{sensor}$ is less than 10 mm, and wherein the detector comprising an array of pixels, each pixel defined by a pixel width, $d_{pixel}$;

one or more optical elements defining a field-of-view, $H_{FOV}$, which is related to the sensor size by $H_{FOV}=m$ $H_{sensor}$, wherein m is the magnification being larger than m=1.5;

a light source for emitting light defined by at least a primary wavelength $\lambda$, whereby the scanner is configured for irradiating an intraoral object with the light;

a beam splitter in optical communication with the light source, the one or more optical elements, and the detector;

wherein the one or more optical elements is an optical focusing element configured for shifting a focal plane of the light at the intraoral object, the focal plane being defined by the object-space numerical aperture, $NA_{object}$, of the one or more lenses, characterized in that:

the pixel-width, $d_{pixel}$, is less than 10 microns; and the intraoral 3D-scanner satisfy the condition that $0.20 \leq \xi \leq 0.6$, wherein:

$$\xi = \left(\lambda\left((1 + 1/m)\right)\right) / (m \, d_{pixel} NA_{obj}).$$

The present disclosure further provides a method for optimizing an intraoral 3D-scanner.

The method comprises the following steps:

providing an optical system for the intraoral 3D-scaner, the intraoral 3D scanner comprising:

a detector, defined by a horizontal sensor size, $H_{sensor}$, wherein $H_{sensor}$ is less than 10 mm, and wherein the detector comprising an array of pixels, each pixel defined by a pixel width, $d_{pixel}$;

one or more optical elements defining a field-of-view, $H_{FOV}$, which is related to the sensor size by $H_{FOV}=m$ $H_{sensor}$, wherein m is the magnification being larger than m=1.5;

a light source for emitting light defined by at least a primary wavelength $\lambda$, whereby the intraoral 3D-scanner is configured for irradiating an intraoral object with the light;

a beam splitter in optical communication with the light source, the one or more optical elements, and the detector, wherein the one or more optical elements is configured for shifting a focal plane of the light at the intraoral object when said movable lens is translated by a focusing-distance, the focal plane being defined by the object-space numerical aperture, $NA_{object}$, of the one or more lenses, selecting an object-space numerical aperture for the intraoral 3D-scanner, defined in terms of the depth-of-field ($DOF_{object}$) by $NA_{obj}{}^2=\lambda/DOF_{object}$, characterized in that optimizing the compact intraoral 3D-scanner by selecting the pixel width, $d_{pixel}$, of the imaging sensor to be: $d_{pixel}=((1+1/m))/(m\ \xi NA_{obj})$, where $\xi$ is $0.20\leq\xi\leq0.6$, such that the pixel-width, $d_{pixel}$, is less than 10 microns.

To understand the presently disclosed compact intraoral 3D-scanner and method for optimizing a compact intraoral 3D-scanner in more details, a derivation of equations, together with the inventor's insight, leading to the invention, is described.

Theory and Insight Leading to the Invention

The transverse magnification, given by the height of the image divided by the height of the object:

$$m_T = h_{image}/h_{object}. \tag{1}$$

The transverse magnification is also called the lateral magnification, or the linear magnification, or the paraxial magnification.

In machine vision, the so-called primary magnification, M, is defined as $$M = H_{sensor}/H_{FOV}, \tag{2}$$

where $H_{sensor}$ is the horizontal sensor size and $H_{FOV}$ is the horizontal field-of-view (FOV).

This corresponds to the transverse magnification by the relationship:

$$M = |m_T|. \tag{3}$$

The inverse of the primary magnification is simply called the magnification, m, thus:

$$m = |1/M|. \tag{4}$$

The axial magnification, $m_z$, also known as the longitudinal magnification, is related to the transverse magnification by the relationship:

$$m_z = n_0/n_1\ m_T^2, \tag{5}$$

where $n_0$ is the refractive index of air, and $n_1$ is the refractive index of the lens. For an optical system, such as a scanner, no is in general terms the refractive index of the medium on the object side, and $n_1$ is the refractive index for the medium on the object side. An approximation, or in special cases when $n_0\approx n_1$, is thus:

$$m_z \approx m_T^2, \tag{6}$$

In addition to transverse and lateral magnification, there is also a magnification factor called angular magnification, MA. The following relationship exist between the angular and the transverse magnification:

$$m_T m_A = n_0/n_1. \tag{7}$$

Further, there exist the following relationship between the axial and the angular magnification:

$$m_z = n_0/n_1\ 1/m_A^2. \tag{8}$$

It therefore follows that:

$$m_z = m_T/m_A. \tag{9}$$

Thus, when the axial magnification of optical system is increased, then the transverse magnification is also increased, and/or the angular magnification is decreased.

The depth-of-field (DOF) is found by the relationship:

$$DOF_{object} = n_0\lambda/NA_{obj}^2, \tag{10}$$

where the object-space numerical aperture and is defined as:

$$NA_{object} = n_0\sin\theta_{object}, \tag{11}$$

where $\theta_{object}$ is the maximal half angle of the cone of light that can enter or exit the lens.

The image-space numerical is similarly defined as:

$$NA_{image} = n_0 \sin\theta_{image} \approx 1/(2N_W) \tag{12}$$

where $\theta_{image}$ is the maximal half angle of the cone of light that can enter or exit the lens, and $N_w$ is the working f-number.

It can be shown that the magnification, m, can also be found as the relationship:

$$m = NA_{image}/NA_{object} = 1/M \tag{13}$$

The depth-of-field, based on equations (10), (12) and (13), can thus be approximated as:

$$DOF_{object} = n_0\lambda/NA_{obj}{}^2 \approx 4n_o\lambda N_W{}^2 1/m^2. \tag{14}$$

To an approximation, the working f-number can be approximated as:

$$N_W \approx (1 - m_T)N = (1 + 1/m \, 1/P)N, \tag{15}$$

where $m_T$ is negative, and P is the pupil magnification, being the ratio of the diameter of the exit pupil to the diameter of the entrance pupil, i.e. $d_{Enp}/d_{Enp}$.

The working f-number can thus be written as:

$$N_W = \beta(1 + 1/m)N, \tag{16}$$

where $\beta$ is a constant that depends on the pupil magnification, P, and the magnification, m. The constant, $\beta$, is written as $\beta=(1+1/m \, 1/P)/(1+1/m)$, and reduces to $\beta=1$ for $P=1$, being the case for symmetric and telecentric lenses. For asymmetric and non-telecentric lenses, $\beta\neq1$. Accordingly, $\beta$ is a constant that depends on the degree of non-telecentricity.

The depth-of-field, $DOF_{object}$ relates to the depth-of-focus $(DOF_{image})$ by the magnification as:

$$DOF_{object} = 1/m^2 DOF_{image} = M^2 DOF_{image}. \tag{17}$$

This follows directly from the definition of the magnification and the depth of field. Thus, for a given depth-of-field, and a large magnification, m, the corresponding dept-of-focus is reduced.

The depth-of-focus is known to be related to the so-called acceptable circle-of-confusion (CoC)-diameter, $d_{CoC}$, which is a constant that depends on the application and visual perception or contrast.

The depth-of-focus is defined in terms of the CoC as follows:

$$DOF_{image} = 2d_{CoC}N \tag{18}$$

In digital imaging with an image sensor, $d_{CoC}$, is typically set to be equal to the pixel size, i.e. $d_{CoC}=d_{pixel}$. This is however a rather strict criterion, and a more relaxed criterion is defined to be where the tolerable circle of confusion is set to two pixels, i.e. $d_{CoC}=2 \, d_{pixel}$.

With this in mind, the depth-of-focus can thus be written as:

$$DOF_{image} = 2\alpha d_{pixel}N, \tag{19}$$

where $\alpha=d_{CoC}/d_{pixel}$, is a constant that depends on the degree of sampling. In typical vision systems, $\alpha$ is set to be between 1 and 2. As described, this depends on the application. By definition, $\alpha$ also depends on how the tolerable circle of confusion is defined, and $\alpha$ thus not a well-defined constant.

From equation (14) and (16), the depth-of-field can be approximated as:

$$DOF_{image} \approx 4n_0\lambda(\beta(1 + 1/m)N)^2 1/m^2 \tag{20}$$

From equation (19) and equation (20), the following is obtained:

$$2n_0\lambda(\beta(1 + 1/m)N)^2 = \alpha d_{pixel}N \tag{21}$$

Thus, by setting $n_0=1$, which is the case for air, the f-number can be obtained as:

$$N = \alpha d_{pixel}/(2\lambda(\beta^2(1 + 1/m)^2)) \tag{22}$$

With equation (19) and (22), the depth-of-field is found to be:

$$DOF_{image} = \alpha^2 d_{pixel}{}^2/(2\lambda(\beta^2(1 + 1/m)^2)) \tag{23}$$

Thus, the depth-of-focus can be found to be:

$$DOF_{object} = \tag{24}$$
$$m^2\alpha^2/\beta^2 d_{pixel}{}^2/(2\lambda((1 + 1/m)^2)) = m^2\xi^2 d_{pixel}{}^2/(2\lambda((1 + 1/m)^2)),$$

where $\xi=\alpha/\beta$ is a constant, which similarly to $\alpha$ and $\beta$, have been defined in the present disclosure. By definition, $\xi$ depends on the degree of sampling and degree on non-telecentricity. By definition, $\xi$ is:

$$\xi = \alpha/\beta = d_{CoC}(1 + 1/m)/((1 + 1/m \, 1/P)d_{pixel}) \tag{25}$$

Since $\alpha$ is between 1 and 2 for a typical well-sampled system, and $\beta=1$ for a telecentric system, $\xi$ is typically between 1 and 2. It is not obvious what the optimal $\xi$-value is for an intraoral 3D-scanner, especially because the acceptable circle-of-confusion is not well-defined and is also application-dependent. From equation (24), it follows however that:

$$\xi = DOF_{object}^{1/2}\left(\lambda^{1/2}\left(\left(1+1/m\right)\right)\right)/\left(md_{pixel}\right) \qquad (26)$$

or simply:

$$\xi = \lambda\left(\left(1+1/m\right)\right)/\left(md_{pixel}NA_{obj}\right) \qquad (27)$$

The inventors of the present disclosure have found that for several optimized intraoral 3D-scanners, as designed, all 3D-scanners comprising an optical focusing element to shift a focal plane of the light at the intraoral object, $\xi$ lies around $\xi=0.4$.

However variations thereof are also found to be acceptable, for example such that $\xi$ varies from 0.2 to 0.6, more preferably such that $\xi$ varies from 0.30 to 0.55, even more preferably such that $\xi$ varies from 0.30 to 0.50, that and more preferably such that $\xi$ varies from 0.3 to 0.45.

As described, $\xi$ depends on the application, and is defined to depend on the degree of sampling, and the degree of non-telecentricity. Effectively, $\xi$, defines the optimal resolution. Thus, if $\xi$ is too small, the signal-to-noise ration becomes too small for correct depth estimation, and if $\xi$ is too large, the resolution becomes too inaccurate to provide a correct depth estimation. It is not obvious what the optimal conditions are for intraoral 3D scanning.

As disclosed herein, the inventors of the present disclosure have found that an optimal intraoral 3D-scanner, comprising an optical focusing element configured to shift the focal plane, is provided when the optical design is optimized such that $0.20\leq\xi\leq0.6$, more preferably such that $0.30\leq\xi\leq0.55$, even more preferably such that $0.30\leq\xi\leq0.50$, most preferably such that $0.3\leq\xi\leq0.45$.

This specific range thus defines how various optical parameters must be set to provide an optimal intraoral 3D-scanner. Further, this range of & reflects how the circle-of-confusion is defined for an optimized intraoral 3D-scanner. The specific range of & defines whether an optical intraoral 3D-scanner has been achieved.

An Example that Demonstrates the Invention

As an example, the inventors have designed a compact intraoral 3D-scanner, which has the following sensor parameters:

$H_{sensor}=7.86$ mm;
$d_{pixel}=7.8$ μm;

In designing the compact intraoral 3D-scanner, it was desired that the field-of-view was applicable for intra-oral 3D scanning, meaning that it should be around 15-20 mm. By having this FOV, scanning is made easy and stitching errors are minimal. It was decided that the FOV was desired to be very close to 20 mm, whereby it followed by definition that the magnification should be:

m=2.46

Further, it was desired that the intraoral scanner should work with multichromatic light, whereby the primary wavelength is set to:

$\lambda=530$ nm=0.53 μm.

In designing the compact intraoral 3D-scanner, the final optimized design ended with $NA_{obj}=0.109$, providing a depth-of-field ($DOF_{image}$) of 44 μm.

By inserting these numbers into equation (27), the &-value is found to be $\xi=0.35$, whereby it can be verified, according to the present disclosed intraoral 3D-scanner, that the designed intraoral 3D-scanner is optimally designed for intraoral 3D-scanning.

Using a primary wavelength that is lower than 0.53 μm, would clearly change $\xi$ to a lower value, and thus lower values of less than $\xi=0.35$ are also found to be optimal for intraoral 3D-scanning.

The above example demonstrates that once the four parameters, m, $\lambda$, $d_{pixel}$, $NA_{obj}$, are established, then it can be verified whether the optical design has been optimized for intraoral 3D-scanning, and thereby is optimized according to the present disclosure.

The magnification factor can be established from measuring the relationship between the sensor size and the field-of-view. The wavelength, the pixel size and the numerical aperture can also be measured. All four parameters can further be directly found from an optical design program such as Zemax, OSLO or Code V.

If only three of the four parameters, m, $\lambda$, $d_{pixel}$, $NA_{obj}$, can be established, the fourth parameter can be optimized according to the present disclosure by requiring that $\xi$ must be between 0.2 and 0.6.

The present disclosure provides a method that optimizes the optical design by selecting $d_{pixel}$ exactly by requiring that $\xi$ must be between 0.2 and 0.6.

If the design cannot be optimized, it can at least be stated what the fourth parameter must be to be optimized for intraoral 3D-scanning.

As an example of the latter, attention can be paid to the design as disclosed in US 2018/0192877. In this disclosure, FIG. 4A shows a compact intraoral 3D-scanner. The field-of-view is illustrated and shown to be with a horizontal FOV of 18 mm. A beam splitter is illustrated and shown to be 10 mm, from which it can be deduced that the sensor, being approximately half the size of the beam splitter, approximately has a horizontal size of 5 mm. From this, it can be deduced that the magnification, m, is approximately m≈3.6.

US 2018/0192877 does not disclose the $NA_{object}$ or the pixel size of any of the optical systems, and thus, these parameters are not disclosed for the system as shown in FIG. 4A of US 2018/0192877.

However, US 2018/0192877 discloses that the scanner is a confocal scanner, and that the size of the pinhole can be configured adapted to the numerical aperture of the optical system and the wavelength of the light source. No further details are provided.

In confocal scanning, requiring a pinhole, it is however well-known that the optimal pinhole is given by the relationship:

$$d_{pinhole} = 0.5 M_{obj}\lambda/NA_{object} \qquad (28)$$

where $M_{obj}$ is the objective magnification of a microscope.

The objective magnification of a microscope, $M_{obj}$, is the inverse of the herein disclosed magnification, m. Further, in a confocal scanner, it is also well-known that the pinhole needs to be matched to the pixel size, $d_{pixel}$. Thus, for a confocal scanner, such as disclosed in US 2018/0192877, it can be established that the optimal numerical aperture must be:

$$NA_{object,confocal} = \left(0.5\ 1/3.6\lambda\right)/d_{pixel} = 0.139\lambda/d_{pixel}. \qquad (29)$$

This is also evident from the well-established fact that in a confocal microscope, the resolution, i.e. the distance between two resolvable points, is given by:

$$r_{confocal} = 0.8\lambda/NA_{object,confocal}. \tag{30}$$

Also, in a well-sampled confocal scanner, the optimal optimum pixel size for sampling the image is at least half of the spatial resolution, this being known as the Nyquest sampling theorem. Thus, in a confocal scanner:

$$d_{pixel} = r_{confocal}/2 = 0.4\lambda/NA_{object,confocal} = 0.4\lambda/NA_{object,confocal} \tag{31}$$

Taking into account the magnification, m, the following is obtained for a confocal scanner:

$$d_{pixel} = 0.4\lambda M/NA_{object,confocal} = 0.4\lambda/(mNA_{object,confocal}), \tag{32}$$

thus matching the confocal pinhole as described in equation (28).

Accordingly, the numerical aperture in a confocal scanner is:

$$NA_{object,confocal} = 0.4\lambda m/d_{pixel}, \tag{33}$$

For m=3.6, the following relationship is obtained:

$$NA_{object,confocal} = 0.111\lambda/d_{pixel}, \tag{34}$$

being very close to the optimal numerical aperture as given in equation (29).

It is noted that for a non-confocal scanner, the resolution is known to be $r_{non-confocal}=1.22\lambda/NA_{object}$, which thus gives:

$$NA_{object,non-confocal} = 0.66\lambda/(md_{pixel}) \tag{35}$$

The above simply shows that a confocal scanner has an improved resolution over a non-confocal scanner, in fact by a factor of $\sqrt{2}$, provided that the numerical aperture is the same. The factor of $\sqrt{2}$ comes directly from the derivation for the resolution for a confocal scanner, and clearly shows the advantage of a confocal scanner, namely more accurate resolution.

Based on the above understanding, it can be established that the numerical aperture of the confocal scanner with m=3.6 as disclosed in US 2018/0192877 is typically set according to equation (29), thus $NA_{object,\ confocal}=0.139\lambda/d_{pixel}$.

This numerical aperture can be compared to the optimal numerical aperture as defined by the presently disclosed compact intraoral 3D-scanner. To compare the numerical apertures for the two different scanners, m is also set identically to m=3.6, whereby it can be established from equation (27) that, the optimal numerical aperture for the presently disclosed compact intraoral 3D-scanner is:

$$NA_{object,intraoral\ 3D-scanner} = 0.355\lambda/(d_{pixel}\xi). \tag{36}$$

The optimal and smallest optimal numerical aperture, according to the present disclosure is when $\xi=0.6$, thus when $$NA_{object,intraoral\ 3D-scanner} = 0.59\lambda/d_{pixel}. \tag{37}$$

By comparing equation (37) to the optimal numerical aperture for a confocal compact scanner as disclosed in US 2018/0192877 and described in relation to FIG. 4A, i.e. with the well-known equation (29) with m=3.6, being $NA_{object,\ confocal}=0.139\lambda/d_{pixel}$, it can be seen that the optimal object-space numerical aperture for the confocal scanner is shown to be a factor of around 4 times smaller than the smallest optimal numerical aperture of the presently disclosed compact intraoral 3D-scanner.

Even by comparing equation (27) to the optimal numerical aperture for a non-confocal scanner, defined by the well-known equation (35) with m=3.6, being $NA_{object,\ non-confocal}=0.183\lambda/d_{pixel}$, the object-space numerical aperture for a typical non-confocal scanner is a factor of more than 3 smaller than the numerical aperture of the presently disclosed compact intraoral 3D-scanner.

The above demonstrates that for a normal imaging system, as described in the beginning, $\xi$ is typically between 1 and 2, while, according to the present disclosure, the optimal $\xi$, is between $\xi=0.2$ and $\xi=0.6$ for an intraoral 3D scanner. Accordingly, there is at least a factor of 1/0.6=1.66 between $\xi$ for a normal imaging system and $\xi$ for an intraoral 3D scanner, which can be up to a factor of 2/0.2=10.

All in all, the above demonstrates how an optimal intraoral 3D-scanner can be optimized and how an optical design can be verified to be optimal.

The above also shows that the optimal numerical aperture for a compact intraoral 3D scanner is very different from what is known in the art for both non-confocal and confocal scanners.

BRIEF DESCRIPTION OF THE DRAWINGS

The above and/or additional objects, features and advantages of the present disclosure, will be further described by the following illustrative and non-limiting detailed description of embodiments of the present disclosure, with reference to the appended drawing(s), wherein:

FIG. 1 shows an example of a compact intraoral 3D scanner according to the present disclosure.

DETAILED DESCRIPTION

Preferred Embodiments of $\xi$

As described in the section "Theory and insight leading to the invention", a preferred embodiment is obtained for $0.30\leq\xi\leq0.55$. This range is found to be optimal mostly for light with a primary wavelength in the mid-visible domain.

As also described, a more preferred embodiment is obtained for $0.30\leq\xi\leq0.50$. This range is found to be optimal mostly by restricting the depth-of-field, such that depth determination is made more optimal.

As finally described, a most preferred embodiment is obtained for $0.30 \leq \xi \leq 0.45$. This range is found to be the most optimal mostly by restricting the depth-of-field, such that depth determination is made the most optimal.

As the value of $\xi$ is directly linked to the depth-of-field (DOF), it is also possible to provide the corresponding DOF.

However, in most preferred embodiments of the present disclosure, the depth-of-field (DOF) is in the range between 10 and 100 microns, more preferably between 20 and 90 microns, most preferably around 35 and 55 microns.

As with the value for $\xi$, a small DOF has the advantage of more precise determination of the correct focus plane, which is important for an accurate calculation of a point cloud. A DOF of less than 10 microns is typically used in microscopy, but this is not required in intra-oral scanning. Further, less than 10 microns may not be practical, because this may also be too small in comparison to the resolution of a device being configured for shifting the focal plane of the light, for example a motor with a lens encoder to shift or translate the optical focusing element. On the other hand, if the DOF is too great, the accuracy is severely impacted. The inventors of the present disclosure have found the above described DOF-range to be optimal for intraoral scanning of a scanner as disclosed herein.

Magnification Factors

In one embodiment of the present disclosure, the magnification factor is larger than 2.0 and less than 2.9. This provides for a sensor size that is relatively small compared to the field-of-view.

In another embodiment of the present disclosure, the magnification factor is larger than 2.3 and less than 2.5. This provides for a sensor size that is relatively small compared to the field-of-view, and which is optimal in terms of light-collection.

One or More Optical Element(s) and Optical Focusing Element

In one embodiment of the present disclosure, the intraoral scanner is configured such that the focal plane shifts by 10-20 mm, preferably by 12-18 mm, more preferably around 15 mm. This focal plane shift is optimal for scanning teeth that have a size of around 10 mm.

In one embodiment of the present disclosure, the focal plane is shifted by configuring the optical focusing element to translate by a focusing-distance. For example, the optical focusing element may be an optical lens element that translates a focusing-distance on a translation stage.

In a preferred embodiment, the focusing-distance is less than 5 mm. For example, the focusing-distance may be 4 mm, or 3 mm, or even 2 mm or 1 mm.

In a most preferred embodiment of the present disclosure, the intraoral scanner is configured such that a focus-gearing being the ratio between the focal plane-shift and the focusing distance is more than 2, more preferably more than 3, most preferably more than 4, such as around 5. Having a high focus-gearing, such as around 5, provides a scanner that is very compact. For example, if a focal shift around 15 mm, and the focus-gearing around 5, then the focusing distance is to be around 3 mm. This means that the optical focusing element is only required to translate 3 mm.

In a more preferred embodiment of the present disclosure, the optical focusing element is an optical lens with a mass of less than 5 grams. When the optical lens is less than 5 grams, the scanner is able to scan rapidly, i.e., to move back and forth, and this low mass provides a solution for an optimal scanning speed.

In a more preferred embodiment, the optical lens is a singlet. This provides for a simple and easy manufacture of the compact intraoral scanner.

In a most preferred embodiment, the optical focusing element is translated back and forth at a scanning frequency by a translation stage, wherein the translation stage is configured to scan at a scanning frequency of around 20 sweeps per second, or more, preferably such as 22 sweeps per second, or preferably such as 23 sweeps per second, preferably such as 24 sweeps per second, or more preferably such as 25 sweeps per second. In other words, the translation stage may be configured to scan at a frequency of between 10 and 12.5 Hz. One solution to achieve the scan at a frequency of between 10 and 12.5 Hz is to provide the optical focusing element in the form of an optical lens with a mass of less than 5 grams, and/or to provide the focus-gearing such that it is around 5. By both having an optical lens with the mass of less than 5 grams and the focus-gearing of around 5, there is provided a technical solution where both the short focusing-distance and the low mass contribute to achieving the scan frequency of between 10 and 12.5 Hz.

In one embodiment of the present disclosure, the one or more optical element(s) is/are at least three lens groups, a first lens group proximate to the beam splitter, a second lens group distal to the beam splitter, and a third lens group between the first and the second lens group, such that the optical focusing element is part of the first lens group.

In another embodiment of the present disclosure, each of said lens groups comprises only spherical lenses. Such an embodiment may provide a low-cost system, since spherical lenses may be simpler to manufacture than for example aspherical lenses.

In yet another embodiment, said lens groups comprises only either singlets or doublets. Such an embodiment may also provide a low-cost system, since singlets or doublets may be simpler to manufacture than for example triplets.

In a related embodiment, the second lens group and the third lens group each comprises a doublet.

Detector and Beam Splitter

Intraoral 3D scanning with an optical focusing element configured for shifting a focal plane of the light at the intraoral object, according to the present disclosure, is typically performed using a hand-held intraoral 3D-scanner.

Thus, in most embodiments, the herein disclosed compact intraoral 3D-scanner is handheld.

In handheld intraoral 3D-scanning, a short time for data acquisition is typically a prerequisite to eliminate relative movement of the tooth and the hand-held device.

Further, during 3D-scanning, as referred to in this disclosure, implies that the optical focusing element shifts the focal plane of the light at the intraoral object. During, the shift of the focal plane, the scanner records a so-called sub-scan. As previously described, shifting of the focal plane may be providing by translating a lens element, such as a focusing lens, by a focusing-distance. Thus, a full sub-scan may be recorded while the focusing lens translates, for example by a focusing-distance of 15 mm.

In a preferred embodiment, it may be desirable to record a sub-scan in less than $\frac{1}{10}$ s, more preferably around $\frac{1}{15}$ s, or most preferably around $\frac{1}{20}$ s. In such a preferred embodiment, the detector, or the image sensor, may be configured to acquire images in very rapid succession.

The shifting of the focal plane may provide a plurality of focal planes during intraoral 3D-scanning. A full sub-scan may for example comprise around 200 focal planes, such as no more than 200 focal planes, or less than 100 focal planes, such than less than 50 focal planes.

If the embodiment with 200 focal planes is desired, using a 15 mm translation of the focusing lens, this corresponds to a depth-resolution of 15 mm/200 mm=75 microns. Accordingly, in such an embodiment, the detector or the image sensor, may be configured to have a frame-rate of 15×200 fps=3000 fps.

In other embodiments, the detector is configured to have a frame-rate of around 3000 fps, whereas in preferred embodiments, the detector is configured to have a frame-rate of more than 3000 fps, such as 6000 fps, or even higher, such as 12000 fps.

In alternative embodiments, where a lower depth-resolution may be possible, the detector is configured to have a frame-rate of less than 3000 fps, such as around 2000 fps, more preferably around 1000 fps.

In very special embodiments, the frame-rate may be less than 100 fps, such as around 30 fps.

In a preferred embodiment, the detector may be a CCD sensor, configured with a frame-rate as suits the purpose of intraoral 3D-scanning. Typically, very high frame-rates, such as around 3000 fps, or more, cannot be achieved from a CCD sensor. Thus, in most preferred embodiments, the detector is a CMOS sensor. A CMOS sensor is further advantageous over a CCD sensor because it comprises a global shutter.

According to the present disclosure, the detector has a horizontal sensor size, $H_{sensor}$, of less than 10 mm. Thus, in some embodiments, the horizontal sensor size, $H_{sensor}$, may be 7.86 mm. In related embodiments, the vertical sensor size may be 6.74 mm. In other words, the active area of the sensor may be 7.86 mm×6.74 mm. Such a in an example of a sensor that measures less than 15 mm along the diagonal.

Also, according to the present disclosure, the pixel-width, $d_{pixel}$, is less than 10 microns. Thus, in some embodiments, the pixel-width, $d_{pixel}$, may be 7.8 microns.

In some embodiments, the horizontal sensor size, $H_{sensor}$, is 7.86 mm, and the pixel-width, $d_{pixel}$, may be 7.8 microns. Such a configuration provides a compact scanner.

As described in relation to the present disclosure, a smaller sensor or detector, in comparison to a larger sensor, affects the overall optical system. For example, as described, the lateral magnification of the optical system depends on the field of view and the sensor size. Thus, a smaller sensor increases the lateral magnification if the field-of-view is desired to be constant for an optical system with a large sensor and an optical system with a smaller sensor.

Having both a small sensor (i.e. as in this case, sensor with a horizontal sensor size, $H_{sensor}$, of less than 10 mm), and a high frame-rate (such as around 3000 frames per second or more) has not previously been possible, since such sensors simply did not exist until recently. With the development of small high-speed sensors, this has now just become possible. The present disclosure provides therefore a solution to design and optimize an intraoral scanner with exactly a combination of small sensor size and high frame-rate.

A high lateral magnification further changes the image space numerical aperture, i.e. if the object numerical aperture is maintained as constant. Thus, designing an intraoral scanner with a small sensor according to the present disclosure, in comparison to designing an intraoral scanner with larger sensor sizes, also affects the ray angle of rays onto the sensor. The ray angles simply become larger for smaller sensors.

Light rays with large incoming angles may be challenging for coatings and sensor quantum efficiency.

In one embodiment, the beam splitter has a high refractive index, such as more than 1.6, more optimally such as more than 1.8, most optimally around 1.84666, particularly at a wavelength of 587.5618 nm. With such a high refractive index, the incoming rays inside the beam splitter, such a beam-splitter cube, are reduced. This embodiment therefore provides a solution to the above-described challenge. In particular, the high refractive index as here described has the effect of reducing the ray angle of rays onto the sensor. A consequence of this is also that the scanner becomes smaller, i.e. because the distance from the beam splitter to the sensor becomes smaller. A reduction of a broad range of ray angles inside the cube, as provided for via described refractive index, may also be beneficial for the effect of the optical coating on the beam splitter, namely because the coating will be able to accept more rays. In one embodiment, the beam splitter is coated with a coating, such as a polarization coating. In a preferred embodiment, the beam splitter has both the high refractive index as described above, and the coating as described above.

The solution(s) with a beam splitter having a high refractive index as described above, provides solution(s) to using a small sensor with a horizontal sensor size, $H_{sensor}$, of less than 10 mm, and may ensure that proper detection is provided.

Light Source

In one embodiment of the present invention, the scanner further comprises an illumination pattern located between the light source and the beam splitter, whereby the illumination pattern is projected as an image onto the object.

In another embodiment of the present invention, the intraoral scanner further comprises a lens module between the light source and the beam splitter, wherein the lens module comprises two lenses disposed along an optical axis of the intraoral scanner.

In a preferred embodiment of the present invention, the light source is an LED module.

Example 1—A Preferred Embodiment of a Compact Intraoral 3D-Scanner

FIG. 1 shows a preferred embodiment of a compact intraoral 3D-scanner 1 according to the present disclosure.

In the preferred embodiment as shown in FIG. 1, the detector 2 measures less than 15 mm along the diagonal. The active area of the detector measures specifically 7.86 mm×6.74 mm.

The beam splitter 3, directs the light from an object (not shown) into the detector 2. Further, the beam splitter 3, which is a beam splitter cube, also direct light from a light source 4 (not shown) onto the object.

In the preferred embodiment as here shown, the object-side numerical aperture is $NA_{object}$=0.10.

Further, in the preferred embodiment, as here shown, the light emitted from light source 4 of the scanner 1 is in the visible domain, and the centre or primary wavelength can then be said to be around 500 and 550 nm, such as around $\lambda$=530 nm=0.53 μm.

FIG. 1 further shows an optical element 5 that is an optical focusing element 6 configured for shifting a focal plane of the light at the intraoral object.

The scanner comprises a total of three optical elements 5. In this, embodiment, the four optical elements are lens elements.

The focal plane is defined by the object-space numerical aperture, $NA_{object}$, of the three optical elements 5.

Accordingly, the corresponding $DOF_{object}$ for $NA_{object}=0.1$ is found from equation (7) and thus:

$$DOF_{object}=0.53/0.1^2=53 \text{ microns}.$$

In the embodiment shown here, the optical axis along the optical elements is bended by a reflective surface 7, such as a mirror. This provides that light can enter an oral cavity and be directed towards objects inside the oral cavity, such as teeth and gingiva.

This ensures that a 3D model of the objects inside the oral cavity can be properly obtained. However, other designs of intraoral scanner, such as without a mirror, are also possible.

In this embodiment, the object(s) is/are not shown, but the focal plane 8 as provided by the present scanner is curved.

According to the presently disclosed scanner, the optical focusing element 6 is configured for shifting the focal plane 8 of the light at the intraoral object. As indicated in the FIG. 1, the optical focusing element is configured to translate back and forth between the two vertical lines, 9 and 10. A front glass element 11 is located before the reflective surface 7. Since the focal plane defines by the object-space numerical aperture, then the object space numerical aparture varies with the position of the optical focusing element.

It is reminded that the intraoral 3D-scanner satisfies the condition that $0.20\leq\xi\leq0.6$, wherein:

$$\xi = \left(\lambda\left((1 + 1/m)\right)\right)/(md_{pixel}NA_{obj}).$$

Therefore, this also means that $\xi$ must satisfy the condition for all focus planes. A single $\xi$-value is thus very hard to obtain, and the range as described above, therefore also reflects this variation.

Further details of the present disclosure are provided by the following items.

Items

1. A compact intraoral 3D-scanner, comprising:
   a detector, defined by a horizontal sensor size, $H_{sensor}$, wherein $H_{sensor}$ is less than 10 mm, and
   wherein the detector comprising an array of pixels, each pixel defined by a pixel width, $d_{pixel}$;
   one or more optical element(s) defining a field-of-view, $H_{FOV}$, which is related to the sensor size by $H_{FOV}=m\ H_{sensor}$, wherein m is the magnification being larger than m=1.5;
   a light source for emitting light defined by at least a primary wavelength $\lambda$, whereby the scanner is configured for irradiating an intraoral object with the light;
   a beam splitter in optical communication with the light source, the one or more optical element(s), and the detector;
   wherein the one or more optical element(s) is/are an optical focusing element configured for shifting a focal plane of the light at the intraoral object, the focal plane being defined by the object-space numerical aperture, $NA_{object}$, of the one or more optical element(s), characterized in that:
   the pixel-width, $d_{pixel}$, is less than 10 microns; and the intraoral 3D-scanner satisfy the condition that $0.20\leq\xi\leq0.6$, wherein:

$$\xi = \left(\lambda\left((1 + 1/m)\right)\right)/(md_{pixel}NA_{obj}).$$

2. The intraoral 3D-scanner according to item 1, wherein $0.30\leq\xi\leq0.55$.
3. The intraoral 3D-scanner according to item 1, wherein $0.30\leq\xi\leq0.50$.
4. The intraoral 3D-scanner according to item 1, wherein $0.30\leq\xi\leq0.45$.
5. The intraoral 3D-scanner according to item 1, wherein the magnification factor is larger than 2.0 and less than 3.0.
6. The intraoral 3D-scanner according to item 1, wherein the magnification factor is larger than 2.3 and less than 2.9.
7. The intraoral 3D-scanner according to item 1, wherein the intraoral scanner is configured such that the focal plane shifts by 10-20 mm, preferably by 12-18 mm, more preferably around 15 mm.
8. The intraoral 3D-scanner according to item 7, wherein the focal plane is shifted by configuring the optical focusing element to translate by a focusing-distance, wherein the focusing-distance is less than 5 mm, such as around 4 mm, such as around 3 mm, such as around 2 mm or such as around 1 mm.
9. The intraoral 3D-scanner according to item 7 and 8, wherein the intraoral scanner is configured with a focus-gearing being the ratio between the focal plane shift and the focusing-distance of more than 2, more preferably more than 3, most preferably more than 4, such as around 5.
10. The intraoral scanner according to any of the preceding items, wherein the optical focusing element is an optical lens with a mass of less than 5 grams.
11. The intraoral scanner according to any of the preceding, wherein the optical focusing element is a singlet.
12. The intraoral scanner according to any of the preceding items, wherein the optical focusing element is configured to translate back and forth at a scanning frequency by a translation stage, wherein the translation stage is configured to scan at a scanning frequency of between 10 Hz and 12.5 Hz.
13. The intraoral scanner according to any of the preceding items, wherein the one or more optical element(s) is/are at least three lens groups, a first lens group proximate to the beam splitter, a second lens group distal to the beam splitter, and a third lens group between the first and the second lens group, such that the optical focusing element is part of the first lens group.
14. The intraoral scanner according to item 13, wherein each of said lens groups comprises only spherical lenses.
15. The intraoral scanner according to any of the items 13-14, wherein each of said lens groups comprises only either singlets or doublets.
16. The intraoral scanner according to any of the items 13-15, wherein the second lens group and the third lens group each comprises a doublet.
17. The intraoral scanner according to any of the preceding items, wherein the scanner further comprises an illumination pattern located between the light source and the beam splitter, whereby the illumination pattern is projected as an image onto the object.
18. The intraoral scanner according to any of the preceding items, wherein the intraoral scanner further comprises a lens module between the light source and the beam splitter, wherein the lens module comprises two lenses disposed along an optical axis of the intraoral scanner.

19. The intraoral scanner according to any of the preceding items, wherein the light source is an LED module.

20. A method for optimizing a compact intraoral 3D-scanner, comprising the steps of:

providing an optical system for the intraoral 3D-scaner, the intraoral 3D scanner comprising:

a detector, defined by a horizontal sensor size, $H_{sensor}$, wherein $H_{sensor}$ is less than 10 mm, and wherein the detector comprising an array of pixels, each pixel defined by a pixel width, $d_{pixel}$;

one or more optical elements defining a field-of-view, $H_{FOV}$, which is related to the sensor size by $H_{FOV}=m H_{sensor}$, wherein m is the magnification being larger than m=1.5;

a light source for emitting light defined by at least a primary wavelength $\lambda$, whereby the intraoral 3D-scanner is configured for irradiating an intraoral object with the light;

a beam splitter in optical communication with the light source, the one or more optical element(s), and the detector, wherein the one or more optical element(s) is/are configured for shifting a focal plane of the light at the intraoral object, the focal plane being defined by the object-space numerical aperture, $NA_{object}$, of the one or more optical element(s), selecting an object-space numerical aperture for the intraoral 3D-scanner, defined in terms of the depth-of-field ($DOF_{object}$) by $NA_{obj}^2=\lambda/DOF_{object}$;

characterized in that optimizing the compact intraoral 3D-scanner by selecting the pixel width, $d_{pixel}$, of the imaging sensor to be: $d_{pixel}=\lambda((1+1/m))/(m \xi NA_{obj})$, where $\xi$ is $0.20\leq\xi\leq0.6$, such that the pixel-width, $d_{pixel}$, is less than 10 microns.

21. The method according to item 20, wherein the depth-of-field, $DOF_{object}$, is selected to be around X-Y.

22. The method according to any of the items 20-21, wherein $0.30\leq\xi\leq0.55$.

23. The method according to any of the items 20-22, wherein $0.30\leq\xi\leq0.50$.

24. The method according to any of the items 20-23, wherein $0.30\leq\xi\leq0.45$.

25. The method according to any of the items 20-24, wherein the magnification factor is larger than 2.0 and less than 3.0.

26. The method according to any of the items 20-25, wherein the magnification factor is larger than 2.3 and less than 2.5.

27. The method according to any of the items 20-26, wherein the intraoral 3D-scanner is further configured according to any of the items 7-16 and/or further comprises any of the features according to any of the items 17-19.

The invention claimed is:

1. A compact intraoral 3D-scanner, comprising:

a detector, defined by a horizontal sensor size, $H_{sensor}$, wherein $H_{sensor}$ is less than 10 mm, and wherein the detector comprising an array of pixels, each pixel defined by a pixel width, $d_{pixel}$;

one or more optical element(s) defining a field-of-view, $H_{FOV}$, which is related to the sensor size by $H_{FOV}=m$ $H_{sensor}$, wherein m is the magnification being larger than m=1.5;

a light source for emitting light defined by at least a primary wavelength $\lambda$, whereby the compact intraoral 3D-scanner is configured for irradiating an intraoral object with the light;

a beam splitter in optical communication with the light source, the one or more optical element(s), and the detector; wherein the one or more optical element(s) is/are an optical focusing element configured for shifting a focal plane of the light at the intraoral object, the focal plane being defined by the object-space numerical aperture, $NA_{object}$, of the one or more optical element(s), wherein:

the pixel-width, $d_{pixel}$, is less than 10 microns; and the compact intraoral 3D-scanner satisfy the condition that $0.20\leq\xi\leq0.6$, wherein:

$$\xi = (\lambda((1 + 1/m))/(md_{pixel}NA_{obj}).$$

2. The compact intraoral 3D-scanner according to claim 1, wherein $0.30\leq\xi\leq0.55$.

3. The compact intraoral 3D-scanner according to claim 1, wherein $0.30\leq\xi\leq0.50$.

4. The compact intraoral 3D-scanner according to claim 1, wherein $0.30\leq\xi\leq0.45$.

5. The compact intraoral 3D-scanner according to claim 1, wherein the magnification factor is larger than 2.0 and less than 3.0.

6. The compact intraoral 3D-scanner according to claim 1, wherein the magnification factor is larger than 2.3 and less than 2.5.

7. The compact intraoral 3D-scanner according to claim 1, wherein the optical focusing element is an optical lens with a mass of less than 5 grams.

8. The compact intraoral 3D-scanner according to claim 1, wherein the optical focusing element is configured to translate back and forth at a scanning frequency by a translation stage, wherein the translation stage is configured to scan at a scanning frequency of between 10 Hz and 12.5 Hz.

9. The compact intraoral 3D-scanner according to claim 1, wherein the beam splitter has a refractive index of more than 1.8 to reduce the ray angle of rays onto the sensor, such that the compact intraoral 3D-scanner is further reduced.

10. The compact intraoral 3D-scanner according to claim 1, wherein the one or more optical element(s) is/are at least three lens groups, a first lens group proximate to the beam splitter, a second lens group distal to the beam splitter, and a third lens group between the first and the second lens group, such that the optical focusing element is part of the first lens group.

11. The compact intraoral 3D-scanner according to claim 10, wherein each of said lens groups comprises only spherical lenses.

12. The compact intraoral 3D-scanner according to claim 10, wherein each of said lens groups comprises only either singlets or doublets.

13. The compact intraoral 3D-scanner according to claim 10, wherein the second lens group and the third lens group each comprises a doublet.

14. A method for optimizing a compact intraoral 3D-scanner, comprising the steps of:

providing an optical system for the compact intraoral 3D-scanner, the compact intraoral 3D scanner comprising:

a detector, defined by a horizontal sensor size, $H_{sensor}$, wherein $H_{sensor}$ is less than 10 mm, and wherein the detector comprising an array of pixels, each pixel defined by a pixel width, $d_{pixel}$;

one or more optical elements defining a field-of-view, $H_{FOV}$, which is related to the sensor size by $H_{FOV}=m$ $H_{sensor}$, wherein m is the magnification being larger than m=1.5;

a light source for emitting light defined by at least a primary wavelength $\lambda$, whereby the compact intraoral 3D-scanner is configured for irradiating an intraoral object with the light;

a beam splitter in optical communication with the light source, the one or more optical element(s), and the detector, wherein the one or more optical element(s) is/are configured for shifting a focal plane of the light at the intraoral object, the focal plane being defined by the object-space numerical aperture, $NA_{object}$, of the one or more optical element(s), selecting an object-space numerical aperture for the compact intraoral 3D-scanner, defined in terms of the depth-of-field ($DOF_{object}$) by $NA_{obj}^2=\lambda/DOF_{object}$; characterized in that optimizing the compact intraoral 3D-scanner by selecting the pixel width, $d_{pixel}$, of the imaging sensor to be: $d_{pixel}=\lambda((1+1/m))/(m\xi NA_{obj})$, where $\xi$ is $0.20 \leq \xi \leq 0.6$, such that the pixel-width, $d_{pixel}$, is less than 10 microns.

15. The method according to claim 14, wherein the depth-of-field, $DOF_{object}$, is selected to be around 35 and 55 microns.

\*   \*   \*   \*   \*